United States Patent
Sasaki et al.

(10) Patent No.: US 6,293,247 B1
(45) Date of Patent: Sep. 25, 2001

(54) LINKAGE DEVICE OF INTERNAL COMBUSTION ENGINE

(75) Inventors: Junya Sasaki; Shunichi Mitsuishi, both of Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/380,711

(22) PCT Filed: May 15, 1998

(86) PCT No.: PCT/JP98/02142
§ 371 Date: Sep. 8, 1999
§ 102(e) Date: Sep. 8, 1999

(87) PCT Pub. No.: WO98/54454
PCT Pub. Date: Dec. 3, 1998

(30) Foreign Application Priority Data

May 26, 1997 (JP) .................................................. 9-135036

(51) Int. Cl.[7] .............................. F02B 31/08; F16H 21/50
(52) U.S. Cl. ................................. 123/308; 74/471 R
(58) Field of Search ................... 123/54.4–54.8, 123/59.5, 306, 308, 336, 580, 583; 74/47, 471 R

(56) References Cited

U.S. PATENT DOCUMENTS

| | | | |
|---|---|---|---|
| 2,420,925 | * 5/1947 | Wirth | 123/583 |
| 2,986,131 | * 5/1961 | Larsen | 123/336 |
| 4,649,876 | 3/1987 | Ohmi et al. | 123/302 |
| 4,768,487 | 9/1988 | Yamamoto et al. | 123/470 |
| 5,524,596 | * 6/1996 | Nakai et al. | 123/583 |
| 5,606,949 | 3/1997 | Ohara et al. | 123/396 |
| 5,704,334 | * 1/1998 | Kato | 123/336 |

FOREIGN PATENT DOCUMENTS

| | | |
|---|---|---|
| 39 34 906 | 11/1990 | (DE) . |
| 40 32 295 | 4/1991 | (DE) . |
| 6-173695 | 6/1994 | (JP) . |
| 07 102 980 | 4/1995 | (JP) . |

* cited by examiner

Primary Examiner—Andrew M. Dolinar
(74) Attorney, Agent, or Firm—Foley & Lardner

(57) ABSTRACT

A linkage device of a V-type internal combustion engine rotates a pair of drive shafts for changing openings of swirl control valves. The linkage device receives reciprocating motion from an actuator through a rod. A center lever connected to the rod changes the reciprocating motion to swing motion and transfers the swing motion to right and left links. The right and left links are connected to the drive shaft through right and left levers, respectively. The right and left links and the right and left levers change the swing motion to rotational motion and apply the rotational motion to the drive shafts.

13 Claims, 8 Drawing Sheets

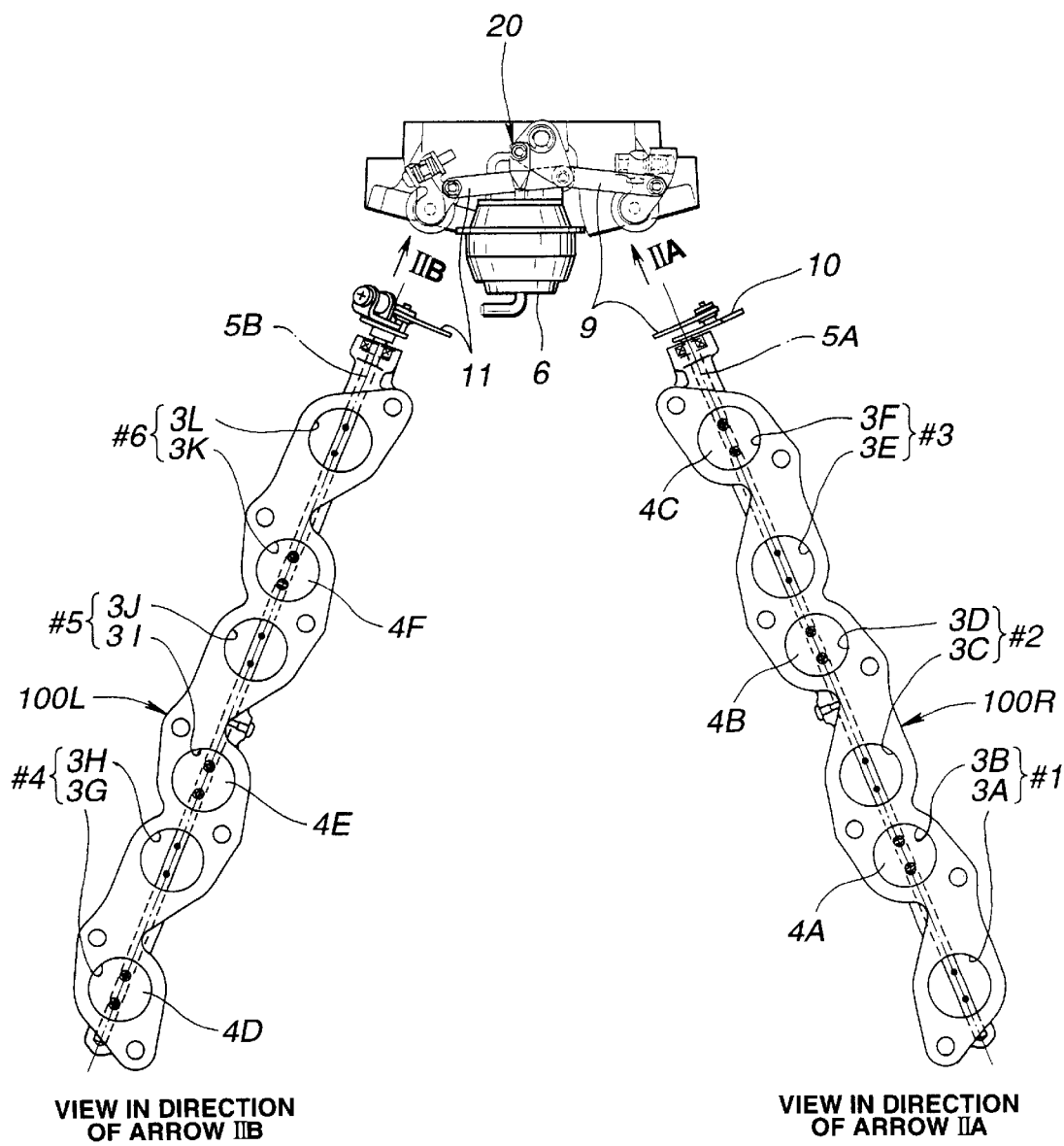

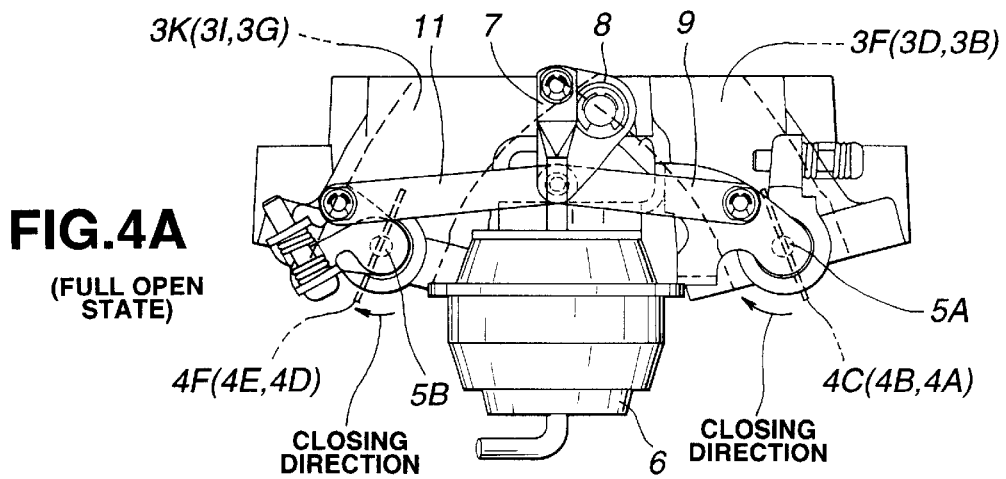
FIG.4A (FULL OPEN STATE)
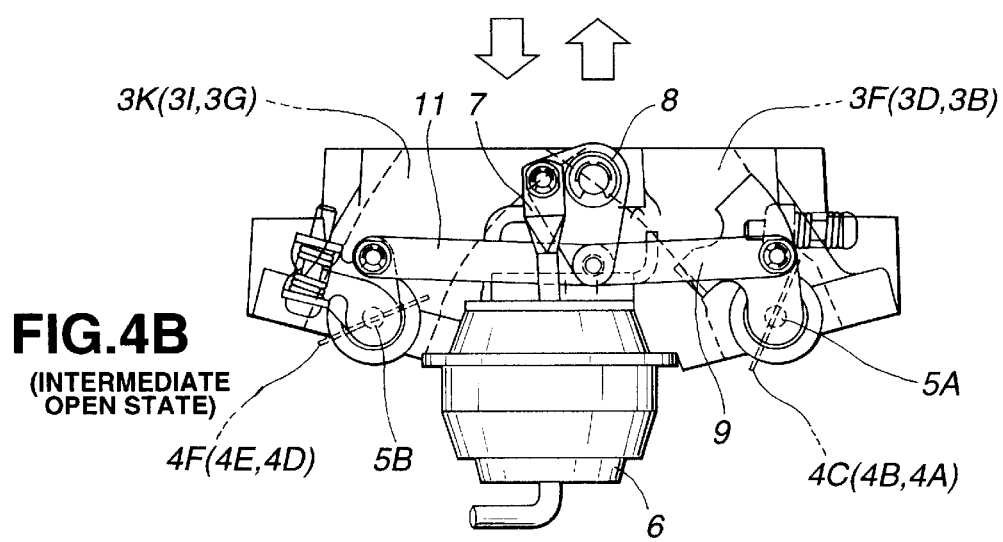
FIG.4B (INTERMEDIATE OPEN STATE)
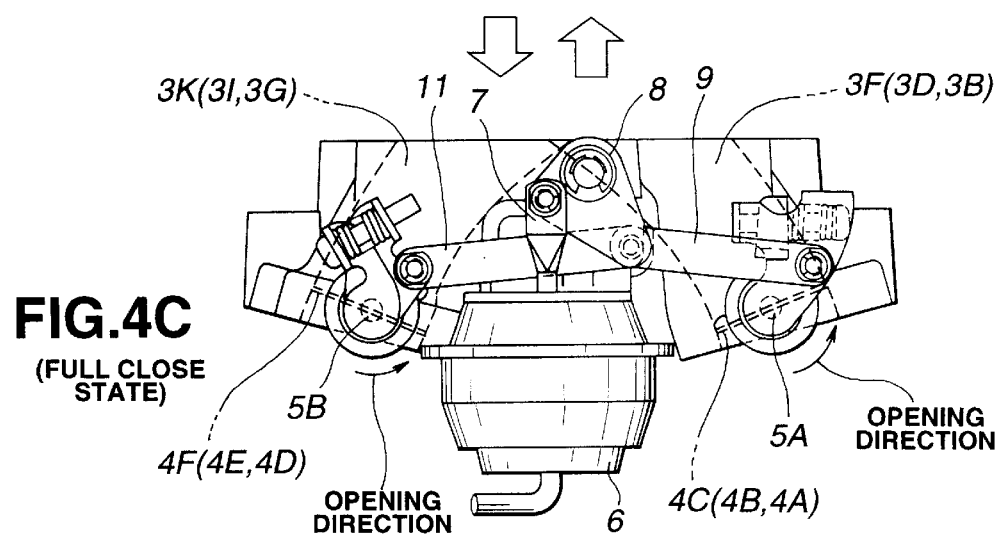
FIG.4C (FULL CLOSE STATE)

(FULL OPEN STATE)

(INTERMEDIATE OPEN STATE)

(FULL CLOSE STATE)

LINKAGE DEVICE OF INTERNAL COMBUSTION ENGINE

The contents of Application No. JP9-135036, with filing date May 26, 1997 in Japan, are hereby incorporated by reference.

BACKGROUND OF THE INVENTION

The present invention relates to a linkage device of an internal combustion engine, and more particularly to a linkage device through which a pair of drive shafts for operating swirl control valves in a V-type engine are rotated by reciprocating-motion generated by an actuator.

Japanese Patent Provisional Publication No. 6-173695 discloses an intake system for an in-line four-cylinder internal combustion engine which device is provided with swirl control valves for controlling in-cylinder air flow such as swirl and tumble of air. These swirl control valves are connected to a common drive shaft which is directly rotated by an actuator. An engine control unit outputs a drive signal determined by an engine operating condition such as load, engine rotation speed and engine temperature to the actuator in order to control the opening of the swirl control valves. If such an intake system is employed in a V-type engine, it is necessary to prepare two drive shafts for respectively operating swirl control valves of two banks of the V-type engine. In order to operate the two drive shafts, it is necessary to provide two actuator or to provide one actuator for directly operating one drive shaft and a linkage device for operating the other drive shaft utilizing the drive power of the actuator.

However, in such arrangements, the actuator is protrudedly installed at end portions of the drive shafts. Such an engine system with this conventional device requires large space, and therefore the total length or height of the engine system may become large. Further, in case that the drive shafts are directly driven by the respective actuators, each of the drive shafts is fixedly connected to each actuator so as not to generate play therebetween. Therefore, if a temperature difference occurs in the engine in the longitudinal direction, the drive shaft may be twisted and therefore the openings of the swirl control valves become different. This opening difference causes the dispersion of the swirls among the combustion chambers of the engine and the degradation of the combustion. Consequently, the performance of the engine may be degraded. Further, in case that one of the two drive shafts is directly driven by the actuator and the other drive shaft is driven by the actuator through a linkage device, it is difficult to synchronize the rotations of the two drive shafts. That is, the operation of the other drive shaft driven through the linkage device is delayed by play caused by the linkage device as compared with the drive shaft directly driven by the actuator. Therefore, the opening of the swirl control valves for one bank becomes different from that of the swirl control valves for the other bank. This dispersion among the openings of the valves causes the dispersion among the swirls in the combustion chambers of the engine and the degradation of the combustion.

SUMMARY OF THE INVENTION

It is an object of the present invention to provide a linkage device which enables two rotation shafts to be rotated by one drive source while improving in structure and size.

Another object of the present invention is to provide an improved linkage device which functions to suppress dispersion of openings of swirl control valves if employed in an internal combustion engine.

A linkage device according to the present invention is for an internal combustion engine and comprises a reciprocating member and a connecting member comprising first and second supporting portions. The first supporting portion of the connecting member is rotatably connected to the reciprocating member. A supporting member is rotatably supporting the connecting member so that the first and second supporting portions are swingable around the supporting member. First and second extending members are rotatably connected to the second supporting portion of the connecting member. The second extending member extends from the second supporting portion toward an opposite direction of an extending direction of the first extending member. First and second lever members are rotatably connected to the first and second extending members, respectively. First and second rotation shafts are fixed to the first and second lever members, respectively. The first and second rotation shafts are synchronously rotated when the reciprocating rod is reciprocated.

BRIEF DESCRIPTION OF THE DRAWINGS

In the drawings, like reference numerals designate like parts and elements throughout all figures, in which:

FIG. 2 is a developed view of the linkage device and intake passages of the engine;

FIGS. 4A to 4C are side views which show different opening conditions of swirl control valves operated by the linkage device;

DETAILED DESCRIPTION OF THE INVENTION

Referring to FIGS. 1 to 6, there is shown a first embodiment of a linkage device 20 installed in a V-type six-cylinder internal combustion engine 100 in accordance with the present invention.

Figure 1:
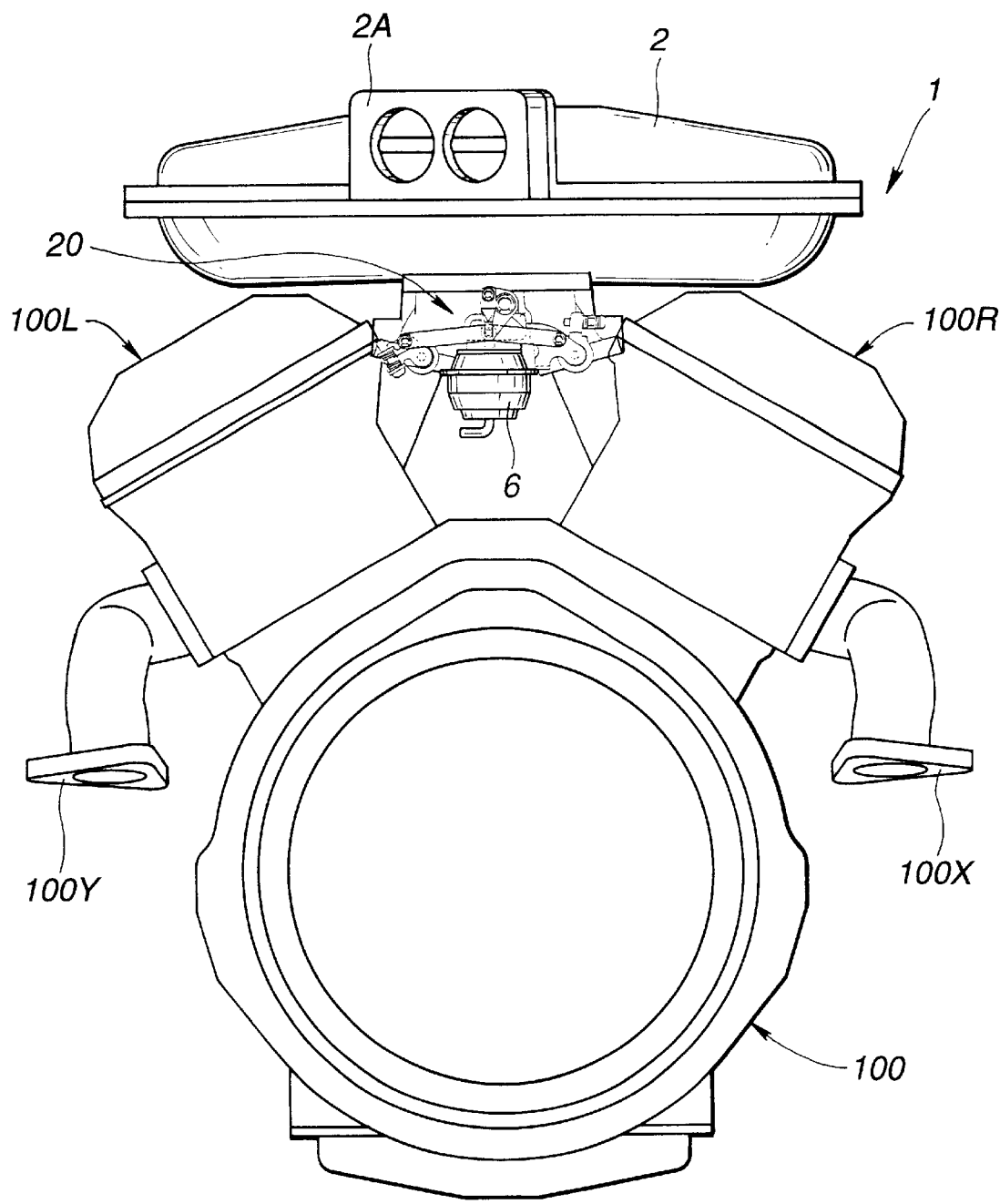
FIG. 1 is a rear view of a V-type internal combustion engine employing a linkage device of the first embodiment according to the present invention.

As shown in FIG. 1, the linkage device 20 according to the present invention is installed in an intake system 1 including an intake collector 2. The intake collector 2 has an inlet installation portion 2A connected to a throttle chamber (not shown). An outlet of the intake collector 2 is connected to right intake passages 3A to 3F and left intake passages 3G to 3L. The right intake passages 3A to 3F and the left intake passages 3G to 3L are connected to a right bank 100R and a left bank 100L of the engine 100, respectively.

As shown in FIG. 2, six pairs of the intake passages 3A and 3B, 3C and 3D, 3E and 3F, 3G and 3H, 3I and 3J, and 3K and 3L are connected to six cylinders #1, #2, #3, #4, #5 and #6 of the engine 100, respectively. Right swirl control valves 4A, 4B and 4C of a butterfly valve type are installed in the right intake passages 3B, 3D and 3F, respectively. Similarly, left swirl control valves 4D, 4E and 4F of a butterfly valve type are installed in one of each pair of the left intake passages 3G, 3I and 3K, respectively. The right swirl control valves 4A, 4B and 4C are fixedly connected to a right drive shaft 5A by means of screws. Similarly, the left swirl control valves 4D, 4E and 4F are fixedly connected to a left drive shaft 5B by means of screws.

Figure 3A:
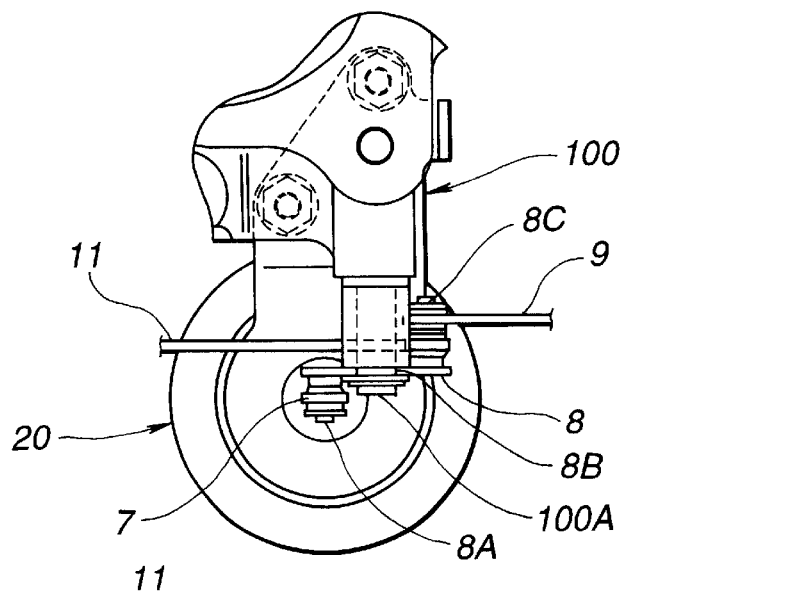
FIG. 3A is a partial top view of the linkage device of the first embodiment according to the present invention.
Figure 3B:
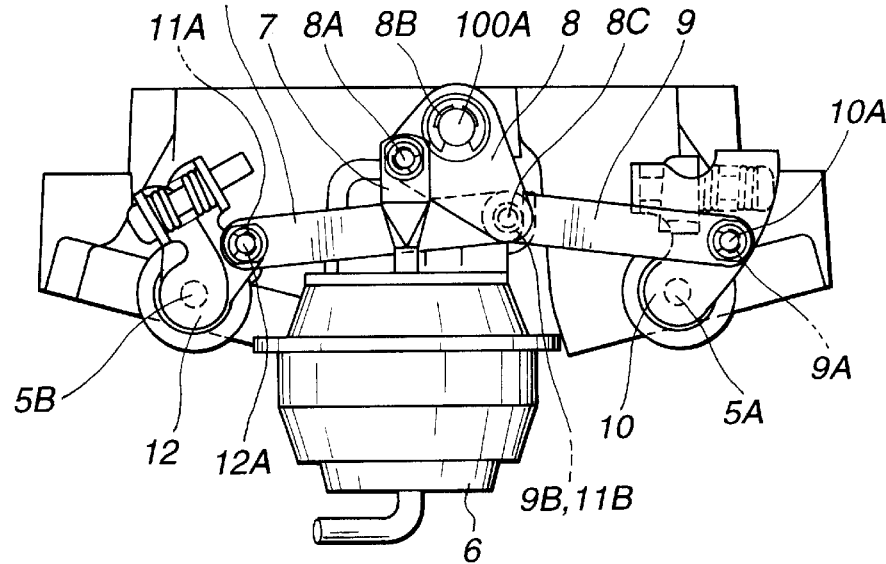
FIG. 3B is a side view of the linkage device of FIG. 3A.

As shown in FIGS. 3A and 3B, an actuator 6 of a vacuum-pressure control type is connected to a rod 7 which reciprocates according to the change of the vacuum pressure applied to the actuator 6. The rod 7 is rotatably connected to a center lever 8 by inserting a first supporting portion 8A of a center lever 8 to a connecting hole 7A of the rod 7. A fulcrum portion (fulcrum hole) 8B of the center lever 8 is rotatably supported to a center shaft 100A projecting from an engine body (part of an intake system) 100B. A second supporting portion 8C of the center lever 8 is rotatably connected to a right link 9 and a left link 11. The center lever 8 is a so-called bell crank which pivots on the center shaft 100A so that the first and second supporting portions 8A and 8C swing around the center shaft 100A inserted to a fulcrum hole 8B of the center lever 8. The center lever 8 is formed such that a line connecting the fulcrum hole 8B and the first supporting portion 8A forms an angle of about 90° with a line connecting the fulcrum hole 8B and the second supporting portion 8C. Further, the connecting point between the right link 9 and the right lever 10 is positioned at a generally upper-most area with respect to the center of the right drive shaft 5A. Similarly, the connecting point between the left link 11 and the left lever 12 is positioned at a generally upper-most area with respect to the center of the left drive shaft SB. Therefore, these connecting points are generally horizontally moved (swung) when the swirl control valves 3A to 3F are operated by the linkage device 20.

In the first embodiment, the right link 9 corresponds to a first extending member of the present invention, and the left link 11 corresponds to a second extending member of the present invention.

The right link 9 is rotatably connected to a right lever 10 fixedly connected to the right drive shaft 5A penetrating the right intake passages 3A, 3B, 3C, 3D, 3E and 3F. The left link 11 is rotatably connected to a left lever 12 fixedly connected to the left drive shaft 5B penetrating the left intake passages 3G, 3H, 3I, 3J, 3K and 3L. More particularly, a supporting portion 10A of the right lever 10 is rotatably inserted to a first connecting hole 9A of the right link 9, and a supporting portion 12A of the left lever 12 is rotatably inserted to a first connecting hole 11A of the left link 11. The connection between the right link 9 and the drive shaft 5A has predetermined play which is produced by loosely forming the first connecting hole 9A of the right link 9 with respect to the supporting portion 10A. Similarly, The connection between the left link 11 and the drive shaft 5B has predetermined play which is produced by loosely forming the first connecting hole 11A of the left link 11 with respect to the supporting portion 12A of the left lever 12. Further, the connection between the right link 9 and the center lever 8 has predetermined play which is produced by loosely forming a second connecting hole 9B of the right link 9 with respect to the second supporting portion 8C. Similarly, the connection between the left link 11 and the center lever 8 has predetermined play which is produced by loosely forming a second connecting hole 11B of the left link 11 with respect to the second supporting portion 8C. It is of course that such plays may be formed only between the center lever 8 and the right and left links 9 and 11 or between the drive shafts 5A and 5B and the right and left links 9 and 11.

The manner of operation of the linkage device 20 and the advantages gained thereby will be discussed hereinafter with reference to FIGS. 4A to 4C.

As shown in FIGS. 4A to 4C, when the engine operating condition including a load condition, an engine rotation speed, a water temperature of the engine, and an engine combustion condition is changed from a full close state wherein one of two intake passages by each cylinder is fully closed by a swirl control valve, the negative pressure applied to a diaphragm chamber 6a of the actuator 6 is changed according to the drive signal from a control unit (not shown). The drive signal is changed according to the engine operating condition. According to the change of the negative pressure, the rod 7 connected to a diaphragm of the diaphragm chamber 6A is upwardly moved from the condition of FIG. 4C to the condition of FIG. 4B and the condition of FIG. 4A.

The center lever 8 is rotated clockwise around the supporting shaft 8D according to the upward movement of the rod 7 as viewed on a front side of each of FIGS. 4A to 4C. The right link 9 connected to the center lever 8 is moved in the left hand side as shown in FIG. 4B according to the clockwise rotation of the center lever 8. Therefore, the drive shaft 5A is rotated in the anticlockwise direction by the right link 9 rotated by the right lever 10.

On the other hand, the left link 11 connected to the center lever 8 is similarly moved in the left hand side according to the clockwise rotation of the center lever 8 as shown in FIG. 4B. Therefore, the driver shaft 5B is rotated in the anticlockwise direction by the left lever 12 rotated by the left rink 11. With these anticlockwise rotations of the right and left drive shafts 5A and 5B, the swirl control valves 4A, 4B and 4C set in the intake passages 3B, 3D and 3F for the right bank 100R and the swirl control valves 4D, 4E and 4F set in the intake passages 3G, 3I and 3K for the left bank 100L are rotated in the same direction and are set in an intermediate open state as shown in FIG. 4B from the full close state of FIG. 4C.

When the rod 7 is further moved upward and moved at an uppermost point as shown in FIG. 4A, the center lever 8 is further rotated in the clockwise direction from the intermediate open state to the full open state shown in FIG. 4A so as to move the second supporting portion 8C to a left-most position. The right link 9 connected to the center lever 8 through the second supporting portion 8C is moved at the left-most position as shown in FIG. 4A. Therefore, the right drive shaft 5A is rotated in the anticlockwise direction and put in a maximum rotated state. On the other hand, the left link 11 connected to the center lever 8 through the second supporting portion 8C is moved at the left-most position as shown in FIG. 4A. Therefore, the left drive shaft 5B is rotated in the anticlockwise direction and put in a maximum rotated state. With these further anticlockwise rotations of the right and left drive shafts 5A and 5B, the right swirl control valves 4A, 4B and 4C and the left swirl control valves 4D, 4E and 4F are rotated in the same direction and are set in the full open state as shown in FIG. 4A.

By setting the swirl control valves 4A to 4F in the full open state, the intake air is supplied to each cylinder #1, #2, #3, #4, #5, #6 through both of the two intake passages 3A and 3B, 3C and 3D, 3E and 3F, 3G and 3H, 3I and 3J, 3K and 3L. Therefore, the flow speed of the intake air is decreased and the flow of the intake air from the one intake passage 3A (3C, 3E, 3G, 3I, 3L) collides with the other flow of the intake air from the other intake passage 3B (3D, 3F, 3H, 3J, 3L) in the combustion chamber so as to suppress the generation of the swirl in each combustion chamber. This swirl suppressing control enables the combustion in each combustion chamber under the high-speed range to be optimized.

That is, by controlling the openings of the swirl control valves 4A to 4F according to the engine operating condition and the combustion condition in the engine 100, an optimized control of the swirl is executed according to the engine operating condition and the combustion condition in the engine 100. This improves the combustion in the combustion chamber of each cylinder #1, #2, #3, #4, #5, #6 of the engine 100.

Since the first embodiment according to the present invention is arranged to drive both of the right and left drive shafts 5A and 5B by means of one actuator 6 through the linkage device 20 and to dispose the actuator 6 at a portion between the drive shafts 5A and 5B, it is possible to arrange the actuator 6 and the linkage device 20 within a predetermined space between the intake passages 3A to 3L and the engine main body. This enables the swirl control system to produce small in size.

Further, since the first embodiment according to the present invention is arranged to locate the second supporting portion 8C between the actuator 6 and the fulcrum hole 8B of the center lever 8, the vertical dimension of the linkage device 20 is suppressed small. Accordingly, the degree of the freedom as to the design of the swirl control system is largely improved and therefore it is possible to improve the swirl control system in weight and in cost.

Additionally, since the first embodiment according to the present invention is arranged to rotate the drive shafts 5A and 5B through the center lever 8, it is easy to change the moving (rotation) amount of the swirl control valves by changing a lever ratio of the center lever 8, which ratio is a ratio between a distance between the supporting portion 7A and the fulcrum portion 8B and a distance between the fulcrum portion 8B and the second supporting portion 8C, while improving a space utility. Therefore, it is possible to simplify the structure of the swirl control system and to decrease the volume of the swirl control system.

Further, with the thus arranged linkage device 20 of the first embodiment, since the linkage device 20 is arranged to absorb the torsion of the right and left drive shafts 5A and 5B caused by the temperature difference between the right and left banks 100R and 100L of the engine 100 by means of the play generated by the linkage device 20, the degradation of the drivability by the temperature difference is prevented although the temperature difference tends to be caused between the banks or cylinders by the difference of the radiation performance on each surface or by unequal cooling through coolant. That is, the linkage device 20 according to the present invention is arranged such that the right and left links 9 and 11 are rotatably connected to the drive shafts 5A and 5B, respectively, with respective plays. These connections with plays function to cancel the unnecessary stress between the parts such as between the drive shaft and the link. For example, even if the temperature difference is generated among cylinders in the same bank, the torsion of the drive shaft 5A, 5B is prevented by this arrangement of the linkage device 20.

The conventional arrangement for directly actuating the drive shaft is not constructed so as to cancel stress applied to the drive shaft when the temperature difference is generated between the intake passages such as 3A and 3B so as to increase the angle therebetween. Therefore, in case of such a conventional arrangement, a forcible stress is applied to the drive shaft and the like so as to generate gall of the drive shafts or breakage thereof.

Further, if the swirl control system is arranged such that one of the two drive shafts is directly driven by the actuator and the other is driven through a linkage device as conventionally, it is difficult to synchronously operate the two drive shafts. That is, since the other drive shaft driven through the link device generates a time delay with respect to the drive shaft directly driven by the actuator due to difference of play of the drive shafts, the difference of the rotated angles of the respective drive shafts is generated. This generates the difference between opening degrees of the swirl control valves of the respective banks. Accordingly, the swirls and the combustion in each cylinder are fluctuated and degraded.

In contrast, the swirl control system employing the linkage device 20 according to the present invention suppresses such dispersion and the degradation. That is, the first embodiment according to the present invention is arranged to generally equivalently transfer the reciprocating motion of the rod 7 to the rotations of the right and left drive shafts 5A and 5B through the center lever 8, the right and left links 9 and 11 and the right and left levers 10 and 12. This prevents the right and left drive shafts 5A and 5B from generating the operational difference therebetween, and therefore the difference between the openings of the right swirl control valves 4A, 4B and 4C and the left swirl control valves 4D, 4E and 4F. Therefore, the swirl control system employing the linkage device 20 according to the present invention enables the cancellation of the opening difference between the right and left swirl control valves 4A, 4B, 4C and 4D, 4E, 4F. Consequently, the first embodiment according to the present invention suppresses the degradation in the engine drivability.

Figure 5:
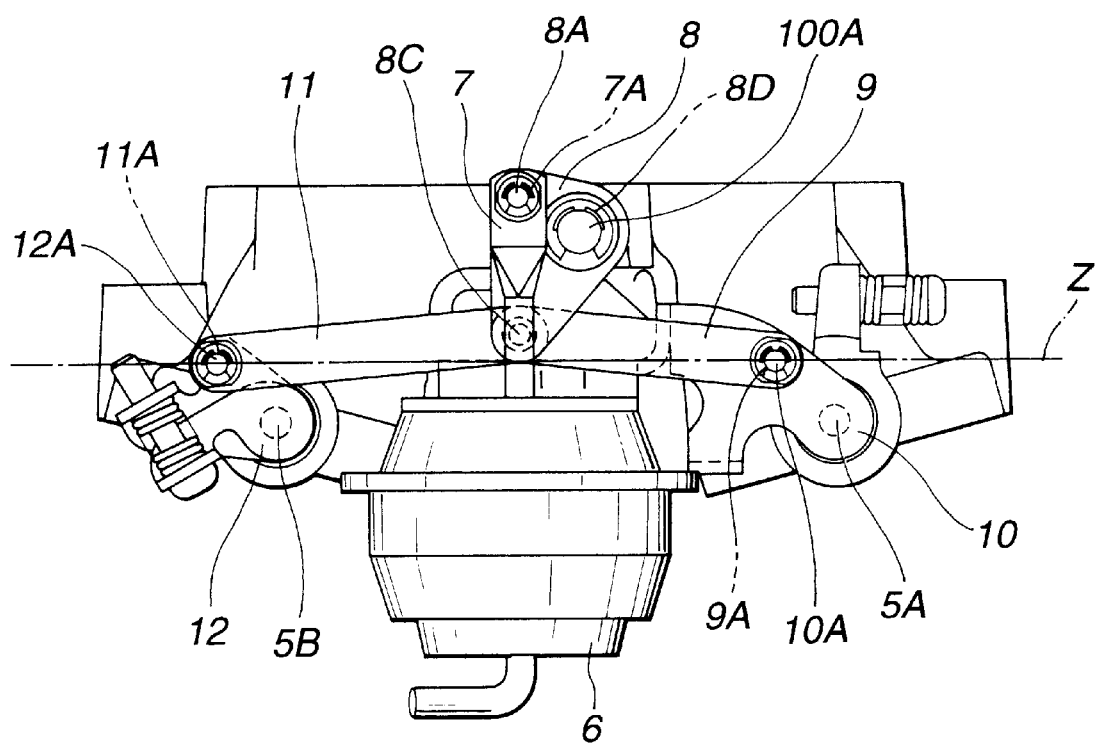
FIG. 5 is a side view of the linkage device put in a full close state.

Furthermore, as shown in FIG. 5, the linkage device 20 according to the present invention is arranged so that the second supporting portion 8C, the supporting portion 10A, the supporting portion 12A, the right and left drive shafts 5A and 5B are not simultaneously located on a straight line such as the line Z of FIG. 5. Therefore, it is possible to prevent the generation of galls of the levers 10 and 12 and links 9 and 11 and abrasion at the supporting portions 8C, 10A and 12A.

That is, if the supporting portions 8C, 10A and 12A and the right and left drive shafts 5A and 5B are arranged to locate on a straight line under the full open state of the swirl control valves 4A to 4F, the linkage device may not be able to properly operate. More particularly, in such a setting under the full open state, the right link 9 may be locked so as not to be able to be rotated between the second supporting portion 8C and the supporting portion 10A when the center lever 8 is rotated in the anticlockwise direction to close the swirl control valves 4A to 4F.

In contrast, according the arrangement of the linkage device 20 it is possible to correctly apply rotational motion to the right and left drive shafts 5A and 5B while preventing the gall of the levers and the links and the abrasion of the supporting portions. The above-mentioned advantages are ensured regardless the dimensional difference between the right and left links 9 and 11.

Figure 6:
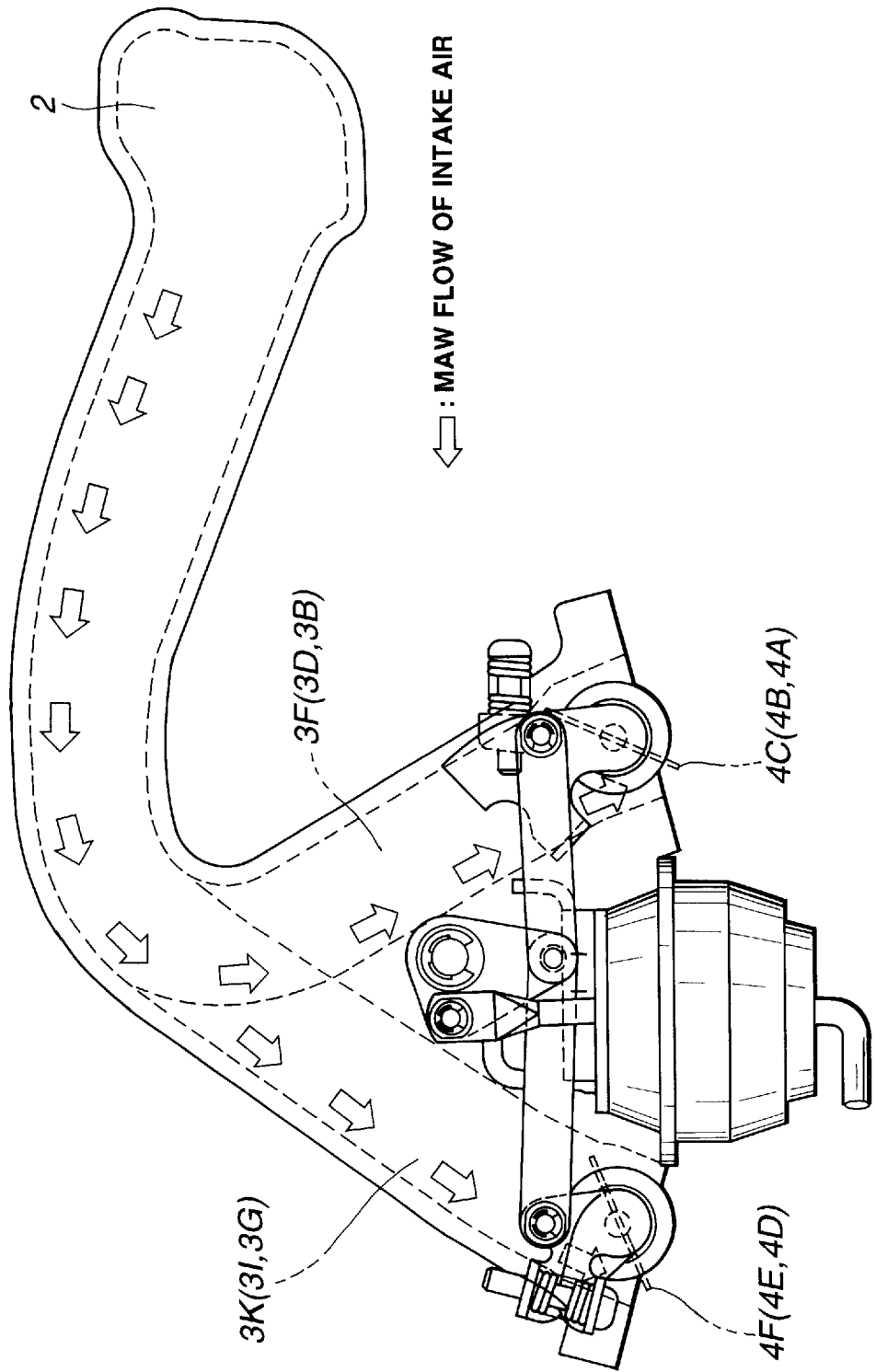
FIG. 6 is a side view which shows a main flow of intake air in intake passages according to the openings of the swirl control valves.

Further, it is preferable that the linkage device 20 according to the present invention is applied to an intake system including the intake passages 3A to 3L shown in FIG. 6. That is, when the right intake passages 3A to 3F connected to the right bank 100R of the engine 100 have bent portions as shown in FIG. 6, the main flow of the intake air in the right intake passages 3A to 3F flows along an outer curved portion in the intake passages 3A to 3F as indicated by white arrows in FIG. 6. The main flow of the intake air in the left intake passages 3G to 3L also flows along outer curved portion in the left intake passages 3G to 3L as indicated by white arrows in FIG. 6. As shown in FIG. 6, the main flow of the intake air in each of intake passages 3B, 3D, 3F, 3G, 3I and 3K provided with each of the swirl control valves 4A to 4F reaches the left side portion of each intake passages. The swirl control valves 4A to 4F are opened by rotating them in the anticlockwise rotation and are arranged such that the left side portion of each of the swirl control valves 4A to 4F is located at a down stream side as compared with the right side portion of each of them. That is, when the swirl control valves 4A to 4F are opened, the main flow of the intake air of the intake passages 3B, 3D, 3F, 3G, 3I and 3K smoothly reaches the respective cylinder #1, #2, #3, #4, #5 and #6 through the swirl control valves 4A to 4F.

Consequently, the linkage device 20 applied to the intake passages shown in FIG. 6 function to smoothly flow intake air to both of the right and left banks 100R and 100L of the engine 100 while suppressing the pressure loss of the intake passages. Therefore, the flow of the intake air including the swirl is stabilized, and the combustion in each cylinder is also stabilized.

Figure 7:
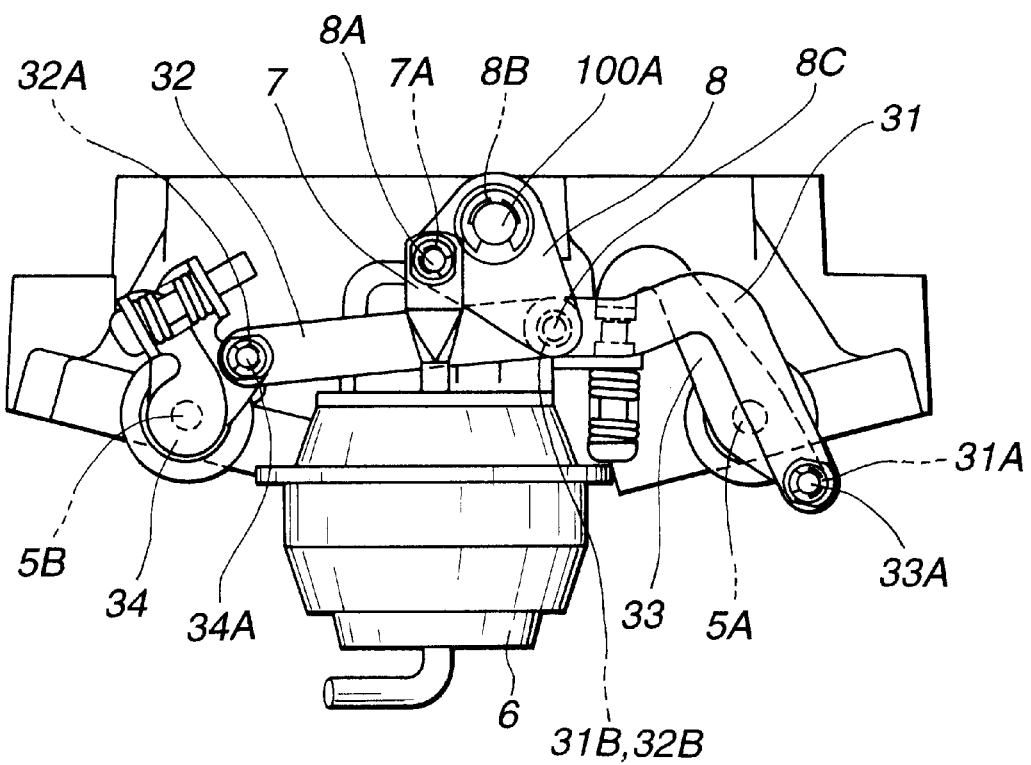
FIG. 7 is a side view which shows a second embodiment of the linkage device according to the present invention.
Figure 8A:
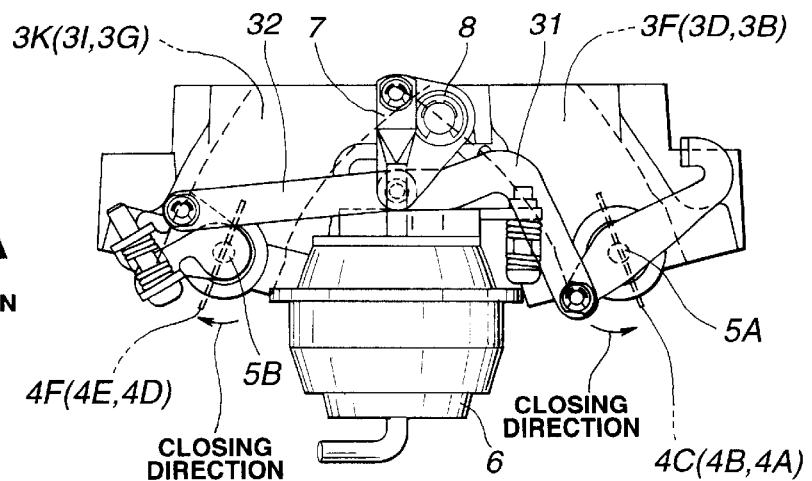
FIGS. 8A to 8C are side views which show different opening conditions of swirl control valves operated by the linkage device of the second embodiment.
Figure 8B:
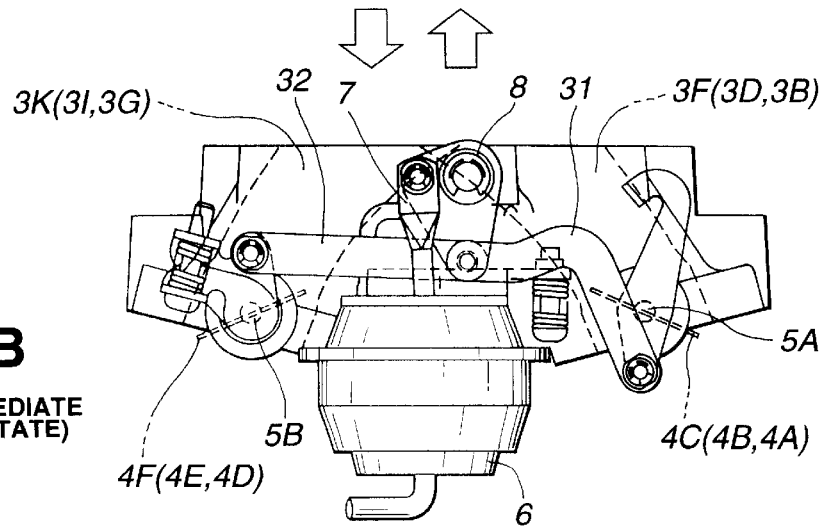
Figure 8C:
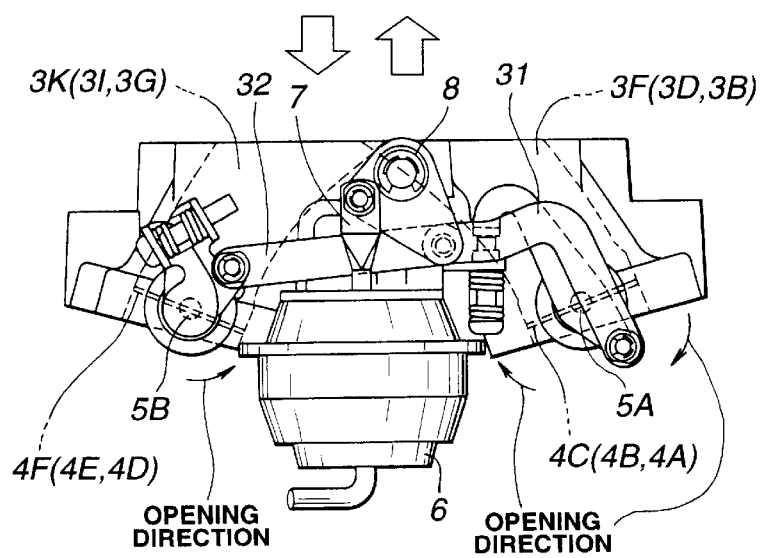

Referring to FIGS. 7 to 8C, there is shown a second embodiment of a linkage device 30 of a swirl control valve system of the V-type six-cylinder internal combustion engine, in accordance with the present invention.

Basically the construction of the second embodiment is the same as that of the first embodiment shown in FIGS. 1 and 2 except that the linkage device 20 is replaced with the linkage device 30 shown in FIG. 7. More particularly, the linkage device 30 of the second embodiment comprises right and left links 31 and 32 and right and left levers 33 and 34 which are different from the right and left links 9 and 11 and the right and left levers 10 and 12 of the linkage device 20 of the first embodiment. The other elements and parts of the second embodiment are the same as those of the first embodiment. Therefore, they are designated by the same reference numeral of the first embodiment, the explanation thereof is basically omitted herein.

As shown in FIG. 7, the rod 7 reciprocated by the actuator 6 is connected to the center lever 8 as is the same in the first embodiment. The center lever 8 is rotatably supported to the engine main body in a manner that the fulcrum hole 8B of the center lever 8 is rotatably engaged with a supporting shaft 100A of the engine main body.

Further, the center lever 8 is rotatably connected with the right link 31. The right link 31 is formed into L-shape and extends from the second supporting portion 8C to a supporting portion 33A of the right lever 33. The right link 31 has a first connecting hole 31A rotatably connected to the right lever supporting portion 33A and a second connecting hole 31B rotatably connected to the second supporting portion 8C. Therefore, the drive shaft 5A is rotated in the clockwise direction on FIG. 7 when the right link 31 is moved in the left hand side in Figure. The left link 32 extends from the second supporting portion 8C to a supporting portion 34A of the left lever 34. The left link 32 has a first connecting hole 32A rotatably connected to the left lever supporting portion 34A and a second connecting hole 32B rotatably connected to the second supporting portion 8C. Therefore, the drive shaft 5A is rotated in the anticlockwise direction on FIG. 7 when the right link 31 is moved in the left hand side in Figure.

The right link 31 corresponds to a first extending member of the present invention, and the left link 32 corresponds to a second extending member of the present invention.

The right link 31 is rotatably connected to a right lever 33 fixedly connected to the right drive shaft 5A disposed in the right bank 100R. The left link 32 is rotatably connected to a left lever 34 fixedly connected to the left drive shaft 5B disposed in the left bank 100L. More particularly, the supporting portion 33A of the right lever 33 is rotatably inserted to the first connecting hole 31A of the right link 31, and the supporting portion 34A of the left lever 34 is rotatably inserted to the first connecting hole 32A of the left link 32. The connection between the right link 31 and the drive shaft 5A has predetermined play which is produced by loosely forming the first connecting hole 31A of the right link 31 with respect to the supporting portion 33A of the right lever 33. Similarly, The connection between the left link 32 and the drive shaft 5B has predetermined play which is produced by loosely forming the first connecting hole 32A of the left link 32 with respect to the supporting portion 34A of the left lever 34. Further, the connection between the right link 31 and the center lever 8 has predetermined play which is produced by loosely forming the second connecting hole 31B of the right link 31 with respect to the second supporting portion 8C. Similarly, the connection between the left link 32 and the center lever 8 has predetermined play which is produced by loosely forming the second connecting hole 32B of the left link 32 with respect to the second supporting portion 8C. It is of course that such plays may be formed only between the center lever 8 and the right and left links 31 and 32 or between the drive shafts 5A and 5B and the right and left links 31 and 32.

The manner of operation of the linkage device 30 of the second embodiment and the advantages gained thereby will be discussed hereinafter with reference to FIGS. 8A to 8C.

That is, as shown in FIGS. 8A to 8C, when the engine operating condition including conditions of a load, an engine rotation speed, a water temperature of the engine, and an engine combustion is changed from a full close condition wherein one of two intake passages by each cylinder is fully closed, the negative pressure being applied to a diaphragm chamber 6a of the actuator 6 is changed according to the drive signal from the control unit. The drive signal is changed according to the engine operating condition. The rod 7 connected to a diaphragm of the diaphragm chamber of the actuator 6 is upwardly moved from the condition of FIG. 8C to the condition of FIG. 8B.

The center lever 8 is rotated clockwise around the supporting shaft 8D according to the upward movement of the rod 7 as viewed on the front of FIGS. 8A to 8C. The right link 31 connected to the center lever 8 is moved in the left hand side as shown in FIG. 8B according to the clockwise rotation of the center lever 8. Therefore, the drive shaft 5A is rotated in the clockwise direction by the right lever 33 through the first supporting portion 31A.

On the other hand, the left link 32 connected to the center lever 8 is similarly moved in the left hand side as shown in FIG. 8B according to the clockwise rotation of the center lever 8. Therefore, the driver shaft 5B is rotated in the anticlockwise direction by the left lever 34 through the first supporting portion 32A. With the clockwise rotation of the drive shaft 5A and the anticlockwise rotation of the drive shaft 5B, the swirl control valves 4A, 4B and 4C set in the intake passages 3B, 3D and 3F for the right bank 100R and the swirl control valves 4D, 4E and 4F set in the intake passages 3G, 3I and 3K for the left bank 100L are rotated in the opposite direction and are set in an intermediate open state as shown in FIG. 8B.

When the rod 7 is further moved upward and moved at an uppermost point, the center lever 8 is further rotated in the clockwise direction from the intermediate open state to the full open state shown in FIG. 8A so as to move the second supporting portion 8C to a left-most position. The right link 31 connected to the center lever 8 through the second supporting portion 8C is moved at the left-most position as shown in FIG. 8A. Therefore, the right drive shaft 5A is rotated in the clockwise direction to a maximum rotated state. On the other hand, the left link 32 connected to the center lever 8 through the second supporting portion 8C is moved at the left-most position as shown in FIG. 8A. Therefore, the left drive shaft 5B is rotated in the anticlockwise direction at a maximum rotated state. With these further rotations of the right and left drive shafts 5A and 5B, the right swirl control valves 4A, 4B and 4C and the left swirl control valves 4D, 4E and 4F are rotated in the opposite direction and are set in the full open state as shown in FIG. 8A.

By setting the swirl control valves 4A to 4F in the full open state, the intake air is supplied to each cylinder #1, #2, #3, #4, #5, #6 through both of the two intake passages 3A and 3B, 3C and 3D, 3E and 3F, 3G and 3H, 3I and 3J, 3K and 3L. Therefore, the flow speed of the intake air is decreased and the flow of the intake air from the one intake passage 3A (3C, 3E, 3G, 3I, 3L) collides with the another flow of the intake air from the other intake passage 3B (3D, 3F, 3H, 3J, 3L) in the combustion chamber so as to suppress the generation of the swirl in each combustion chamber. This swirl suppressing control enables the combustion in each combustion chamber under the high-speed range to be optimized.

That is, by controlling the openings of the swirl control valves 4A to 4F according to the engine operating condition and the combustion condition in the engine 100, an optimized control of the swirl is executed according to the engine operating condition and the combustion condition in the engine 100. This improves the combustion in the combustion chamber of each cylinder #1, #2, #3, #4, #5, #6 of the engine 100.

Since the second embodiment according to the present invention is arranged to drive both of the right and left drive shafts 5A and 5B by means of one actuator 6 through the linkage device 30 and to dispose the actuator 6 at a portion between the drive shafts 5A and 5B as is the same as the first embodiment, it is possible to arrange the actuator 6 and the linkage device 30 within a predetermined portion between the intake passages 3A to 3L and the engine main body. This enables the swirl control system to produce small in size.

Further, since the second embodiment according to the present invention is arranged to locate the second supporting portion 8C between the actuator 6 and the fulcrum hole 8B of the center lever 8, the vertical dimension of the linkage device 30 is suppressed small. Accordingly, the degree of the freedom as to the design of the swirl control system is largely improved and therefore it is possible to improve the swirl control system in weight and in cost.

Additionally, since the second embodiment according to the present invention is arranged to rotate the drive shafts 5A and 5B through the center lever 8, it is easy to change the moving (rotation) amount of the swirl control valves by changing a lever ratio of the center lever 8, which ratio is a ratio between a distance between the supporting portion 7A and the fulcrum hole 8B and a distance between the fulcrum hole 8B and the second supporting portion 8C, while improving space utility. Therefore, it is possible to simplify the structure of the swirl control system and to decrease the volume of the swirl control system.

Further, with the thus arranged linkage device 30 of the second embodiment, since the linkage device 30 is arranged to absorb the torsion of the right and left drive shafts 5A and 5B caused by the temperature difference between the right and left banks 100R and 100L of the engine 100 by means of the play generated by the linkage device 30, the degradation of the drivability by the temperature difference is prevented although the temperature difference tends to be caused between the banks or cylinders by the difference of the radiation performance on each surface or by unequal cooling through coolant. That is, the linkage device 30 according to the present invention is arranged such that the right and left links 31 and 32 are rotatably connected through the right and left levers 33 and 34 to the drive shafts 5A and 5B, respectively, with respective plays. These connections with plays function to cancel the unnecessary stress between the parts such as between the drive shaft and the link. For example, even if the temperature difference is generated among cylinders in the same bank, the torsion of the drive shaft 5A, 5B is prevented by this arrangement of the linkage device 30.

Since the conventional arrangement for directly actuating the drive shaft is not constructed so as to cancel stress applied to the drive shaft when the temperature difference is generated between the intake passages such as 3A and 3B so as to increase the angle therebetween, a forcible stress is applied to the drive shaft and the like so as to generate gall of the drive shafts or breakage thereof. In contrast, the swirl control system employing the linkage device 30 according to the present invention suppresses such dispersion and the degradation.

Furthermore, as shown in FIG. 7, the linkage device 30 according to the present invention is arranged so that the second supporting portion 8C, the supporting portion 33A, the supporting portion 34A, the right and left drive shafts 5A and 5B are not simultaneously positioned on a straight line. Therefore, the linkage device 30 securely applies rotational moment to the right and left drive shaft through the right and left links 31 and 32 and the right and left levers 33 and 34 and to prevent the generation of galls of the levers 33 and 34 and links 31 and 32 and abrasion at the supporting portions 8C, 32A and 34A.

It will be understood that the above-mentioned advantages are ensured regardless the lengths of the right and left links 31 and 32.

Further, it will be understood that return springs for applying returning-force may be installed to the drive shafts 5A and 5B, in order to securely and quickly rotate the right and left drive shafts 5A and 5B from predetermined rotated positions to the initial position.

Although the preferred embodiments according to the present invention have been shown and described so as to be applied to a V-type six-cylinder internal combustion engine, it will be understood that the present invention is not limited to the engine of this type and may be applied to other engines such as a horizontal opposed type engine or other multi-bank type engine.

While the preferred embodiments according to the present invention have been shown and described such that the linkage devices 20 and 30 are applied to swirl control valve control system, it will be understood that the linkage devices 20 and 30 according to the present invention may be applied to a system wherein two rotation shafts are rotated by one reciprocate-type actuator, such as a throttle value operating system or EGR valve operating system.

What is claimed is:

1. A linkage device of an internal combustion engine comprising:

a reciprocating member;

a connecting member comprising first and second supporting portions, the first supporting portion being rotatably connected to said reciprocating member;

a supporting member rotatably supporting said connecting member so that the first and second supporting portions are swingable around said supporting member;

first and second extending members rotatably connected to the second supporting portion of said connecting member, said second extending member extending from the second supporting portion toward an opposite direction of an extending direction of said first extending member;

first and second lever members rotatably connected to said first and second extending members, respectively; and first and second rotation shafts fixed to said first and second lever members, respectively, said first and second rotation shafts being synchronously rotated when said reciprocating member is reciprocated, wherein the engine employing the linkage device is a V-type engine comprising first and second banks, and wherein first swirl control valves are fixed to said first rotation shaft and second swirl control valves are fixed to said second rotation shaft.

2. A linkage device as claimed in claim 1, wherein the second supporting portion of said connecting member is located between said supporting member and a drive source for reciprocating said reciprocating member.

3. A linkage device as claimed in claim 1, wherein said first extending member is rotatably connected to said first lever with predetermined play, and said second extending member is rotatably connected to said second lever with predetermined play.

4. A linkage device as claimed in claim 1, wherein said first and second extending members are rotatably connected to said connecting member with predetermined plays.

5. A linkage device as claimed in claim 1, wherein said first and second rotation shafts are rotated in the same direction according to reciprocating motion of said reciprocating member.

6. A linkage device as claimed in claim 1, wherein a first connecting point between said first extending member and said first lever, a second connecting point between said second extending member and said second lever and the second supporting portion are arranged so as not to be aligned on a straight line.

7. A linkage device as claimed in claim 1, wherein said connecting member is a bell crank.

8. A linkage device as claimed in claim 1, wherein said connecting member is arranged such that a line connecting the first supporting portion and a portion supported to said supporting member forms an angle of about 90° with a line connecting the second supporting portion and the portion supported to said supporting member.

9. A linkage device as claimed in claim 1, wherein a connecting point between said first link and said first lever is positioned at a generally upper-most area with respect to the center of said first rotation shaft, and a connecting point between said second link and said second lever is positioned at a generally upper-most area with respect to a center of the second rotation shaft.

10. A linkage device as claimed in claim 1, wherein these connecting points are generally horizontally swung when said first and second rotation shafts are rotated.

11. A linkage device as claimed in claim 1, wherein said first swirl control valves are disposed in first intake passages and said second swirl control valves are disposed in second intake passages.

12. A linkage device of a V-type internal combustion engine comprising:

a reciprocating rod;

a center lever having first and second supporting portions and a fulcrum portion, the first supporting portion being rotatably connected with said reciprocating rod, the fulcrum portion being rotatably supported to a portion of the engine so that the first and second supporting portions swing around the fulcrum portion;

a first link having input and output portions, the first link input portion being rotatably connected to the second supporting portion of said center lever;

a second link having input and output portions, the second link input portion being rotatably connected to the second supporting portion of said center lever;

a first drive shaft rotatably disposed in first intake passages connected to a first bank of the V-type engine;

a second drive shaft rotatably disposed in second intake passages connected to a second bank of the V-type engine;

a first lever fixed to said first drive shaft, said first lever having a connecting portion rotatably connected to the first link output portion, the first lever connecting being swung on said first drive shaft according to reciprocating motion of said reciprocating rod so that said drive shaft is rotated; and a second lever fixed to said second drive shaft, said second lever having a connecting portion rotatably connected to the second link output portion, said first lever being swung on said second drive shaft according to reciprocating motion of said reciprocating rod so that said second drive shaft is rotated.

13. A linkage device of an internal combustion engine comprising:

a reciprocating member;

a connecting member comprising first and second supporting portions, the first supporting portion being rotatably connected to said reciprocating member;

a supporting member rotatably supporting said connecting member so that the first and second supporting portions are swingable around said supporting member;

first and second extending members rotatably connected to the second supporting portion of said connecting member, said second extending member extending from the second supporting portion toward an opposite direction of an extending direction of said first extending member;

first and second lever members rotatably connected to said first and second extending members, respectively; and first and second rotation shafts fixed to said first and second lever members, respectively, said first and second rotation shafts being synchronously rotated in opposite directions according to a reciprocating motion of said reciprocating member when said reciprocating member is reciprocated.

* * * * *